Oct. 28, 1930.     W. G. BEECHER ET AL     1,779,998
STORAGE BUILDING
Filed July 24, 1929     6 Sheets-Sheet 4
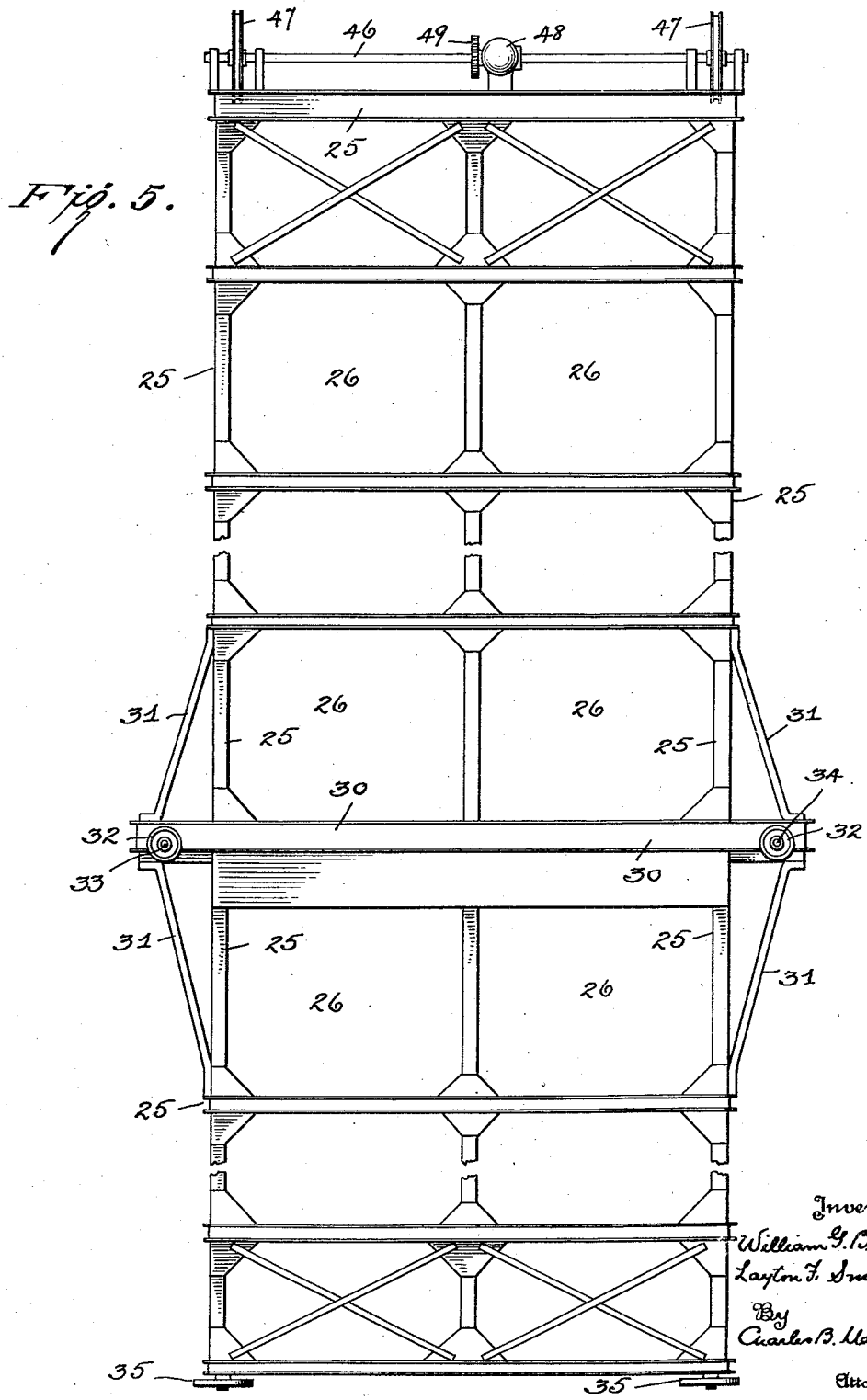

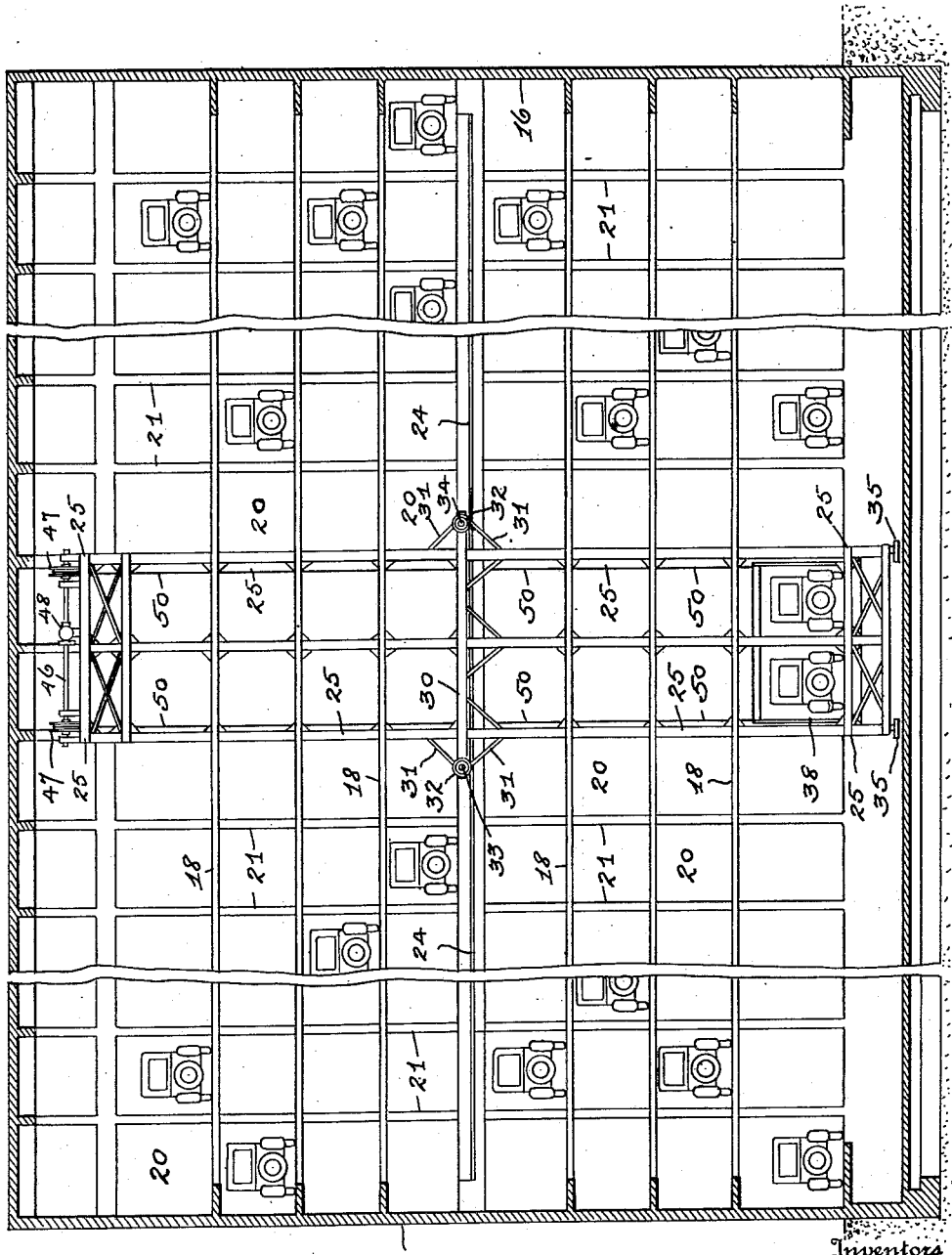

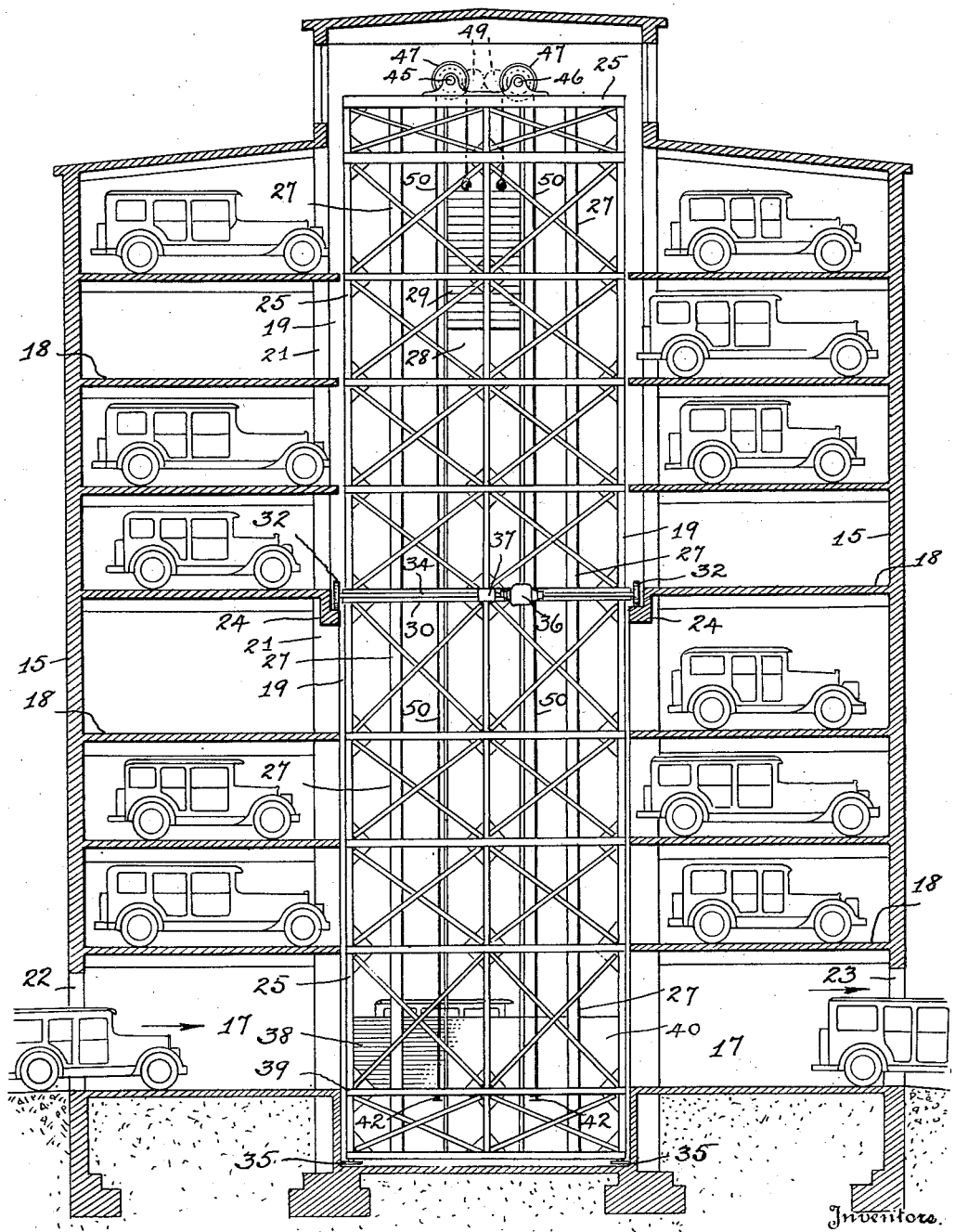

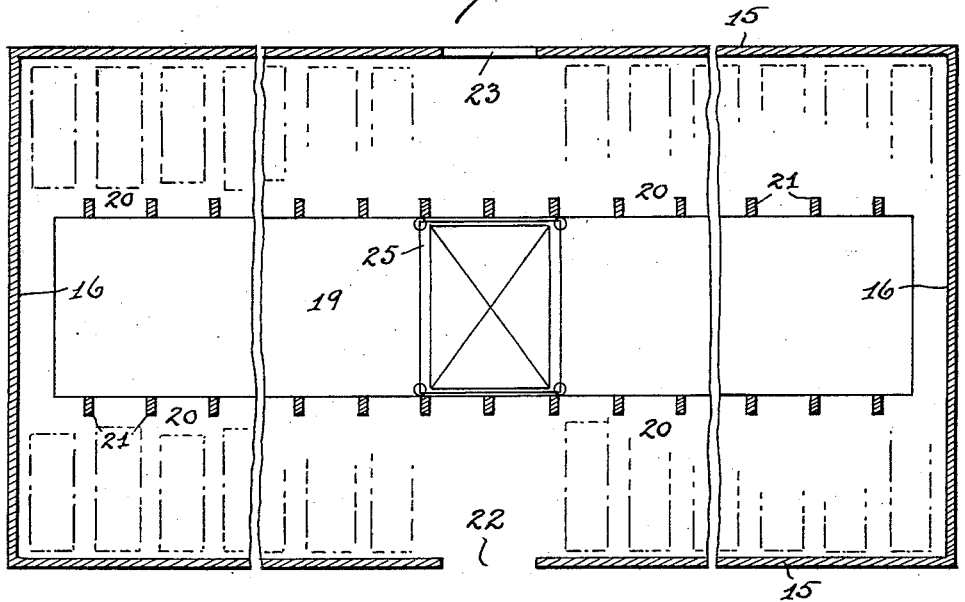
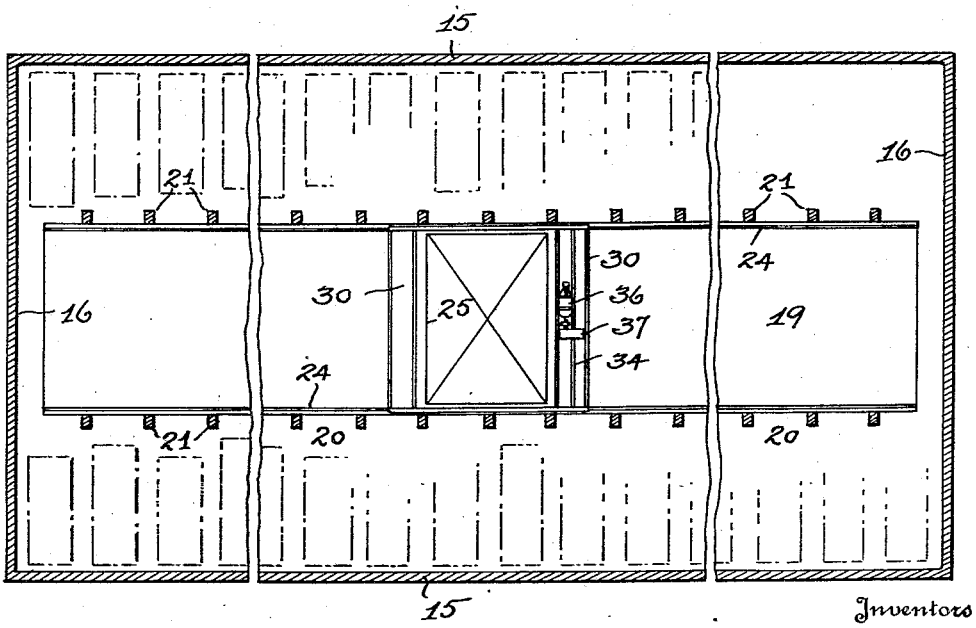

Oct. 28, 1930.  W. G. BEECHER ET AL  1,779,998
STORAGE BUILDING
Filed July 24, 1929   6 Sheets-Sheet 5

Inventors.
William G. Beecher
Layton F. Smith
By Charles B. Mann Jr.
Attorney

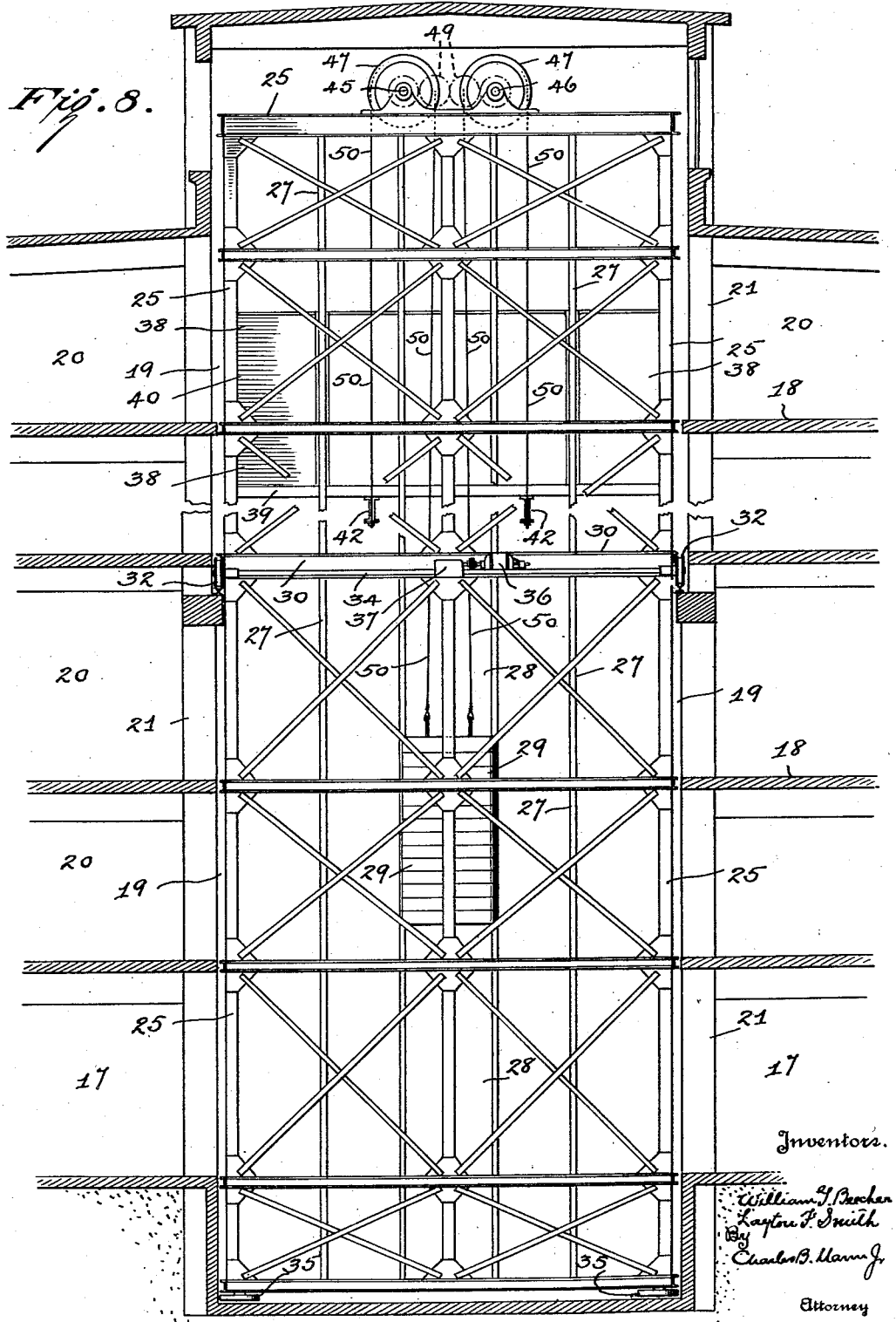

Patented Oct. 28, 1930

1,779,998

UNITED STATES PATENT OFFICE

WILLIAM GORDON BEECHER AND LAYTON F. SMITH, OF BALTIMORE, MARYLAND, ASSIGNORS TO THE MAXIMUM STORAGE GARAGE PLANNING CORPORATION, A CORPORATION OF DELAWARE

STORAGE BUILDING

Application filed July 24, 1929. Serial No. 380,523.

This invention relates to improvements in storage buildings and while it is more particularly directed to a building for the storage of automobiles, it may as readily be used for other storage purposes.

Automobile parking has become a very serious question in large cities, particularly in congested business districts, and the problem, in many localities, has resulted in stringent regulations against the parking of automobiles along the streets in such districts. These stringent regulations cause considerable hardship to many who live in outlying and suburban districts and depend on their private vehicles for transportation to and from business, or who desire to attend places of amusement or who have been in the habit of driving to the shopping or marketing localities.

Such a large proportion of the population has been affected by the regulations against parking, that many garage buildings for the temporary storage of automobiles during day and evening hours have become necessary.

One of the difficulties in meeting the situation has been the high price of property in the neighborhoods where temporary storage is desired and the excessive cost for such storage buildings.

Another difficulty has been the tremendous loss of storage space in and the excessive cost of such buildings because aisles had to be set apart to enable automobiles to be parked in and removed from the parking or storage areas.

Many of the present buildings are provided with ramps from floor to floor in order that cars may be moved from one floor to another under their own power, but such ramps also consume much space and are very expensive to construct, and moreover, if the time should come when it is desired to utilize the building for other purposes the expense of alterations is prohibitive.

Where a number of floors are provided and elevators to raise and lower the cars are employed, a great deal of space must be provided on each floor for manipulation of cars to get them to and from the elevators and the place of storage. Moreover, this elevator method and the shifting of cars on each floor results in considerable loss of time, and in rush hours, is almost maddening.

It has also been proposed to construct a storage building with a vertical and longitudinally-extending hatchway therein and with storage cells on opposite sides of the hatchway. Then with that hatchway, to provide an elevator means mounted on a carriage at the bottom of the hatchway or suspended from some means at the top of the hatchway so that the elevator may be moved both vertically and longitudinally with respect to that hatchway.

While to our minds, this form of building is on the proper plan, it must be of a height to provide sufficient storage to justify the expense of erection, and the elevator means must be quite different from anything suggested in the prior art to give said means sufficient stability and height of operation, so that it may be operated with expedition and prevent congestion in rush hours.

Our invention therefore has for its object to provide a storage building with a vertical and longitudinally-extending hatchway, on the opposite sides of which in different vertical and horizontal planes there are arranged series of storage compartments, and to combine therewith an improved elevator means which has vertical and horizontal movement that will enable the same to move a car from the lower floor to an upper compartment or vice versa, with dispatch.

With these objects in view, the invention is illustrated in the accompanying drawings, wherein,—

Fig. 1 shows a vertical longitudinal section through a storage building as viewed on the line 1—1 of Fig. 2.

Fig. 2 illustrates a vertical cross-sectional detail through the building,—as viewed on the line 2—2 of Fig. 1.

Fig. 3 shows a horizontal sectional plan through the building on the line 3—3 of Fig. 2.

Fig. 4 illustrates another sectional plan through the building as viewed on the line 4—4 of Fig. 2.

Fig. 5 shows the detached elevator tower structure in front elevation and on an enlarged scale.

Fig. 8 illustrates the tower in side elevation and the building in vertical section across the hatchway, with the elevator, the sheaves, counterweights and the cables.

Figures 6, 7:
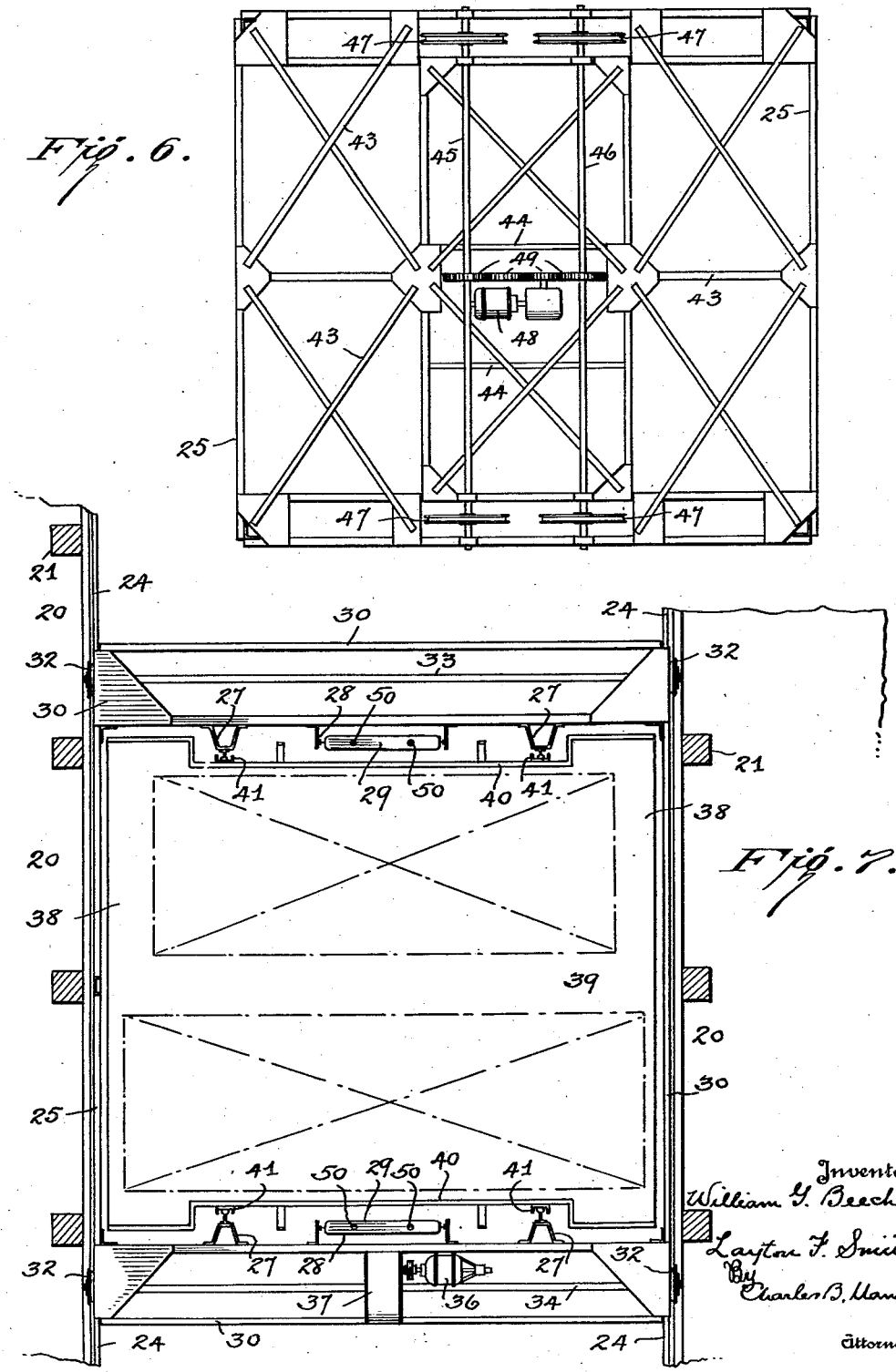
Fig. 6 illustrates the same in top view.
Fig. 7 shows a horizontal sectional plan through the elevator tower just above the carriage as viewed on the line 7—7 of Fig. 8.

In carrying out our invention, we construct the building proper with suitable side and end vertical walls 15 and 16 and with a lower entrance floor 17 and a series of horizontal floors 18 arranged at suitable distances apart from the lower floor, but it is to be understood that the entrance and exit floors need not be the lowermost floor, nor on the same level.

A vertical and longitudinal hatchway 19, extends through the building between the end walls 16 and from the lowest floor to and above the uppermost floor.

On opposite sides of this hatchway, each floor is divided into horizontal rows of storage spaces 20. These storage spaces on each floor may be separated or partitioned one from another, or not, as desired, but the arrangement of the spaces on the various floors is such, that in the completed building they will present a series of vertical rows from the lowest floor up, with a storage space 20 of one floor in the same vertical plane as similar spaces on the floors above and below it.

In the drawings, we have shown in Figs. 1 to 4 inclusive, a series of vertical columns or supports 21, extending from the lowest floor up between adjacent vertical rows of parking spaces, but it is to be understood that this arrangement of columns is not essential and that a lesser number than that shown may be employed.

In Figs. 2 and 3, we also show a building in which the lower or ground floor 17 is provided with entrances 22 and exits 23 through the side walls 15. Obviously, this is also immaterial to the invention, but is desirable, particularly during rush hours.

In the construction of the building, we make provision at opposite sides of the hatchway for sustaining horizontal tracks or supports 24, which tracks extend horizontally along the sides of the hatchway between the two end walls 16 and are located between the top and bottom of the hatchway.

In the present illustration of Figs. 1 and 2, these horizontal tracks or supports 24 are shown about half way between the top and bottom of the hatchway, but the number of tracks and their horizontal locations will depend upon the height of the building and may vary accordingly.

The purpose of these tracks or supports 24, will presently be fully explained.

In the hatchway, we provide an elevator-tower 25, which is constructed of suitable metal members, well braced and tied together, to form a substantial rectangular frame which is open down through the center from top to bottom, to form a supplemental vertical hatchway for an elevator to travel therein.

The elevator tower 25, at two opposite sides, which may, for reasons presently to appear, be properly termed the front and rear, has a series of openings 26 in vertical alinement and arranged one above another forming a vertical row between the bottom and top of the tower.

In fact, we prefer to provide two vertical rows of such front and rear openings 26 in the tower,—each opening being substantially the width and height of the storage spaces 20 on each floor of the building at the opposite sides of the vertical and longitudinal hatchway. The size of these front and rear openings must be at least sufficient to permit an automobile to pass therethrough.

It is not material to the invention as to just how the sides of the elevator tower are braced, but it is important that these opposite sides be provided with vertical elevator-guides 27 extending substantially from the bottom to the top of the tower and on the inner sides thereof.

In the present instance, we provide two of these vertical guides 27, at each of the opposite inner sides of the tower as shown in Fig. 7 of the drawings.

We also provide each of the said sides of the elevator-tower with vertical guideways 28 to receive and guide suitable counter-weights 29, for an elevator that will presently be explained.

Between the top and bottom of the elevator-tower, and preferably about midway therebetween, we provide the tower with a carriage 30.

This carriage includes a horizontal frame built entirely around the outer side of the rectangular tower and is rigidly secured thereto. Suitable vertical bracing 31, extends both upwardly and downwardly from the carriage to the tower-frame, so that the carriage and tower will be inseparably and permanently connected.

The carriage, at each of the opposite sides of the tower, has wheels 32, which latter, in this instance, are carried on shafts 33 and 34 of the carriage which shafts extend in a direction from front to rear of the tower but at the opposite sides of the latter.

When the tower is in place in the vertical longitudinal hatchway of the building, the wheels 32, of the carriage 30, rest upon, and are supported by the horizontal tracks or supports 24, and the tower therefore has a portion extending above the carriage and another portion which depends below the carriage, but both the upward-projecting and lower depending portions of the tower are carried by the carriage, which in turn is supported by its wheels on the horizontal tracks 24.

There are decided advantages in supporting the tower between its lower and upper ends in a hatchway in which it is to have lateral motion and to also operate the tower from its intermediate point of suspension.

If such a tower is supported at its base, there will be a lag to the top of the tower when lateral movement at the base is started. The reverse takes place at the top of the tower when the same is stopped.

If, on the other hand, the tower is suspended from a traveling carriage the same objections maintain, only they are reversed.

If the tower is suspended from above or supported from its base, any slight variation from perfect alignment of tracks or carriage will be greatly multiplied at the other extremity of the tower, preventing proper registration of the elevator with the floors.

These difficulties are multiplied as the height of the tower increases.

If the tower is high, and supported at either end, the conditions to be met when starting or stopping the lateral movement of the tower will vary according to the location of the loaded elevator in the tower. If the load be at or near the end opposite that at which the driving means is located, then when the driving means is stopped, the loaded end of the tower, because of momentum, tends to continue to move and thus tends to throw the weight of the load on the forward supporting wheels and lift the load from the rear wheels, thereby causing a swaying that prevents accurate registration of the tower with the desired parking spaces on the floors.

By therefore locating the supporting means and the driving means for the tower near the center of gravity of the tower, a more rapid and accurate handling of the tower and the load is attained.

The tower is therefore sustained in the hatchway of the building by a carriage located between its lower and upper ends.

Suitable guide rollers 35, such as are provided at the lower end of the elevator tower may be arranged at desirable locations between the carriage and the upper or lower ends of the tower to give stability thereto.

It has been explained that the wheels 32 of the carriage are carried on shafts 33 and 34 and that those wheels are supported on the horizontal tracks 24. If therefore either, or both, of those shafts and attached wheels are rotated, the carriage, and the tower supported thereby, will be moved laterally through the building hatchway.

With this object therefore in view, we provide a reversible motor mechanism 36 on the carriage, which latter is connected by suitable gearing in the housing 37 to the shaft 34, so that by the operation of the motor, the shaft 34 may be turned in the desired direction and the carriage and elevator tower thus moved laterally in a corresponding direction along the tracks 24 to any vertical row of parking spaces at either side of the longitudinal hatchway of the building.

The tower sustaining mechanism and the means for moving the tower laterally are therefore located at a point, preferably, about midway between the top and bottom of the tower.

It has hereinbefore been stated that the tower structure is provided on its interior with vertical elevator guides 27 and also has vertical guideways 28 for elevator counterweights 29, all of which indicates that an elevator and, of course, an operating mechanism for the same is provided.

An elevator 38 having a platform 39 and vertical side-frames 40, is located within the rectangular tower-frame,—the vertical side-frames 40 each having suitable guide-devices 41, to engage the stationary guides 27 that extend vertically from the top to the bottom of the tower.

Cross-beams 42, are also employed, in this instance, which beams extend crosswise under the elevator-platform and project slightly at opposite sides of the elevator so that the hoisting cables, presently to be preferred to, may be connected therewith.

At the top, the tower is braced in a crosswire direction by structural metal members 43, and a horizontal frame 44, which are directly over the shaft which the tower frame forms and in which the elevator is to travel.

The top frame, in this instance, supports two horizontal sheave-shafts 45 and 46 which extend crosswise from side to side of the tower-frame and at right angles to the entrance and exit openings 26 in the front and rear of the tower. Each sheave-shaft carries a sheave 47 on each of its ends and the two shafts are connected to a motor 48, through gearing 49.

Cables 50, have their ends attached to the ends of the cross-beams 42, beneath the elevator platform, and these cables extend up through the tower and around the sheaves 47 and then extend down through the tower-shaft and connect with the counterweights 29 in the guideways 28 at the inner sides of the tower-frame.

Obviously, the control mechanisms for the elevator hoisting means and for the carriage and tower-operating means may be readily arranged on the elevator, but this mechanism forms no part of our invention, and we therefore deem it unnecessary to illustrate the same.

From the above explanation and description, it will be seen that an automobile may be driven into the building and through the receiving front opening of the depending portion of the elevator-tower onto the elevator therein. No turning or manipulation of the automobile except in a direct forward or backward direction is necessary from the time the automobile is pointed toward the tower openings on the receiving level or floor until the automobile is brought to the delivery level or floor.

The operator will then cause the power mechanism on the tower carriage to operate and thus move the carriage laterally together with the tower so as to present the front and rear openings of the elevator to the desired vertical line or row of storage or parking spaces.

At the same time, the elevator mechanism on top of the tower may be operated simultaneously in order to move the elevator vertically in the tower shaft to the desired floor. The elevator platform thus traveling horizontally and vertically at the same time in order to save time.

When the particular parking space is reached, no turning of the car or elevator is necessary, and all the attendant has to do is to move the car off the same end of the elevator at which it was entered, to park it on one side of the hatchway, or move it from the opposite side of the elevator and through the tower-opening to park it at the opposite side of the hatchway.

When that same car is removed, it will be brought down by the attendant and when it reaches the lower floor, it will have the same position and be facing in the same direction as when it was driven onto the elevator when taken up, and it may then be driven ahead and off the opposite end of the elevator and out through the exit at the opposite side from where it entered the building.

The entire operation is therefore carried on without turning the car after it is once pointed toward the tower openings, and may thus be done with expedition and without interfering or the handling or movements of other cars.

As the elevator and tower illustrated are designed to accommodate two cars at a time, one car may be put into or removed from one parking space, and the tower and elevator then moved to park or remove another car from another space, and the two cars thus handled between the time the elevator leaves the ground floor and returns.

Having described our invention, we claim,—

1. In a storage building a plurality of floors with a hatchway extending vertically and longitudinally through the floors to provide access to the storage spaces at opposite sides of the hatchway on each floor, an elevator tower extending vertically through the hatchway and having front and rear openings facing the floors at each side of the hatchway, means engaging the tower between its uppermost and lowermost ends and sustaining the same vertically at such intermediate point in the hatchway, an elevator movable vertically in the tower and means for moving the tower and the elevator therein together in a horizontal plane along the hatchway.

2. In a storage building a plurality of floors with a hatchway extending vertically and longitudinally through the floors to provide access to the storage spaces at opposite sides of the hatchway on each floor, an elevator tower extending vertically through the hatchway and having front and rear openings facing the floors at each side of the hatchway, means engaging the tower between its uppermost and lowermost ends for sustaining the same vertically in the hatchway, an elevator in the tower, means for moving the elevator vertically in the tower and means at the intermediate sustaining means of the tower between the uppermost and lowermost ends thereof for moving the tower and the elevator therein together in a horizontal plane along the hatchway.

3. In a storage building a plurality of floors with a hatchway extending vertically and longitudinally through the floors to provide access to the storage spaces at opposite sides of the hatchway on each floor, an elevator tower extending vertically through the hatchway and having front and rear openings facing the floors at each side of the hatchway, a carriage sustained at the sides of the hatchway between the uppermost and lowermost floors and engaging the tower between the uppermost and lowermost ends thereof for sustaining the tower intermediate its ends and in a vertical position in the hatchway, power means for moving the carriage and tower horizontally, an elevator in the tower and movable with the tower and carriage, and means for moving the elevator vertically in the tower.

4. In a storage building a plurality of floors with a hatchway extending vertically and longitudinally through the floors to provide access to the storage spaces on each floor at opposite sides of the hatchway, a horizontal trackway at opposite sides of the hatchway between the uppermost and lowermost floors, a carriage on said trackway, tower means extending through the carriage so as to extend above and depend below the carriage, an elevator in said tower-means, means for moving the elevator vertically in the tower-means and means for moving the carriage horizontally to impart a like movement to the tower-means and the elevator in a direction longitudinally of the hatchway.

In testimony whereof we affix our signatures.

WILLIAM GORDON BEECHER.
LAYTON F. SMITH.